United States Patent

Delcroix

[15] 3,665,666
[45] May 30, 1972

[54] DEVICES FOR INTERCONNECTING PLATES

[72] Inventor: Andre Delcroix, 5, rue Pasteur, 59-Wattrelos, France

[22] Filed: Dec. 3, 1970

[21] Appl. No.: 94,930

[52] U.S. Cl. ................................52/461, 52/468, 52/489
[51] Int. Cl. .........................................E04b 2/30, E04b 2/60
[58] Field of Search....................52/461, 463, 464, 468, 488, 52/489

[56] References Cited

UNITED STATES PATENTS

| | | | |
|---|---|---|---|
| 2,001,943 | 5/1935 | Steeple | 52/464 |
| 2,845,154 | 7/1958 | Duffield | 52/464 |
| 3,028,938 | 4/1962 | Schorr | 52/464 |
| 3,376,676 | 4/1968 | Tatevossian | 52/463 |

FOREIGN PATENTS OR APPLICATIONS

| 261,297 | 1/1950 | Switzerland | 52/463 |
|---|---|---|---|

*Primary Examiner*—Henry C. Sutherland
*Attorney*—Robert E. Burns and Emmanuel J. Lobato

[57] ABSTRACT

A device for interconnecting two adjacent spaced plates forming at least part of a wall, comprises a cover plate arranged on one side of the plates, a plurality of monobloc connectors arranged on the opposite side of the plates and a pair of channel members for each connector. The connectors are each in the form of a central member provided at each end with transverse flanges extending from opposite sides of the central member. The connectors each have a projection extending beyond the flanges into the space between the plates, the flanges and the projection defining between them a pair of opposed grooves. Each groove receives a limb of a channel member. Each projection is formed with a slot which divides the projection into two parts and receives and holds a complementary shaped rib on the cover plate. The minimum width of each groove is less than the thickness of its respective limb so that when the limbs are arranged in the grooves, the two parts of the projection are urged towards each other to grip the rib.

8 Claims, 3 Drawing Figures

Patented May 30, 1972

DEVICES FOR INTERCONNECTING PLATES

BACKGROUND OF THE INVENTION

The invention relates to devices for connecting together two adjacent plates arranged in the same place to form at least, a part of a wall, partition or the like.

As realized hitherto, such devices are very advantageous for assembling plates together to form a wall or partition, in a simple and inexpensive manner. In addition, the utilization of synthetic plastics material for parts of these devices has enabled a good acoustic and thermal insulation to be obtained, as no metallic pieces need be in contact.

AIMS OF THE INVENTION

An object of the present invention is the provision of an improved device for interconnecting plates. In particular, an object of the present invention is the provision of a device for connecting together adjacent plates, which device is inexpensive to manufacture and quick to assemble and dismantle.

According to one aspect of the present invention, a device for interconnecting two adjacent, spaced plates lying in substantially the same plane and forming at least part of a wall, comprises a cover plate positioned on a first side of the plates and having surfaces for engaging a first side surface of each plate and a rib extending into the space between the plates, a connector positioned on the opposite side of the plates and having a central web provided at one end with a pair of transverse flanges extending from the flanges into the space between the plates, the projection being formed at its free end with a slot which divides the projection into two parts and receives said rib, the projection and flanges defining between them two opposed grooves, and a pair of channel members arranged one on each side of the connector, one limb of each channel member engaging the second side surface of a plate and extending inwardly towards the connector, the free end of each limb engaging in a groove of the connector, the minimum width of each groove being less than the thickness of its respective limb so that when the limbs are arranged in the grooves, the two parts of the projection are urged towards each other to grip the rib.

DESCRIPTION OF THE DRAWINGS

Embodiments of the invention will now be described, by way of example, reference being made to the figures of the accompanying drawings in which.

DESCRIPTION OF A PREFERRED EMBODIMENT

Figure 1:
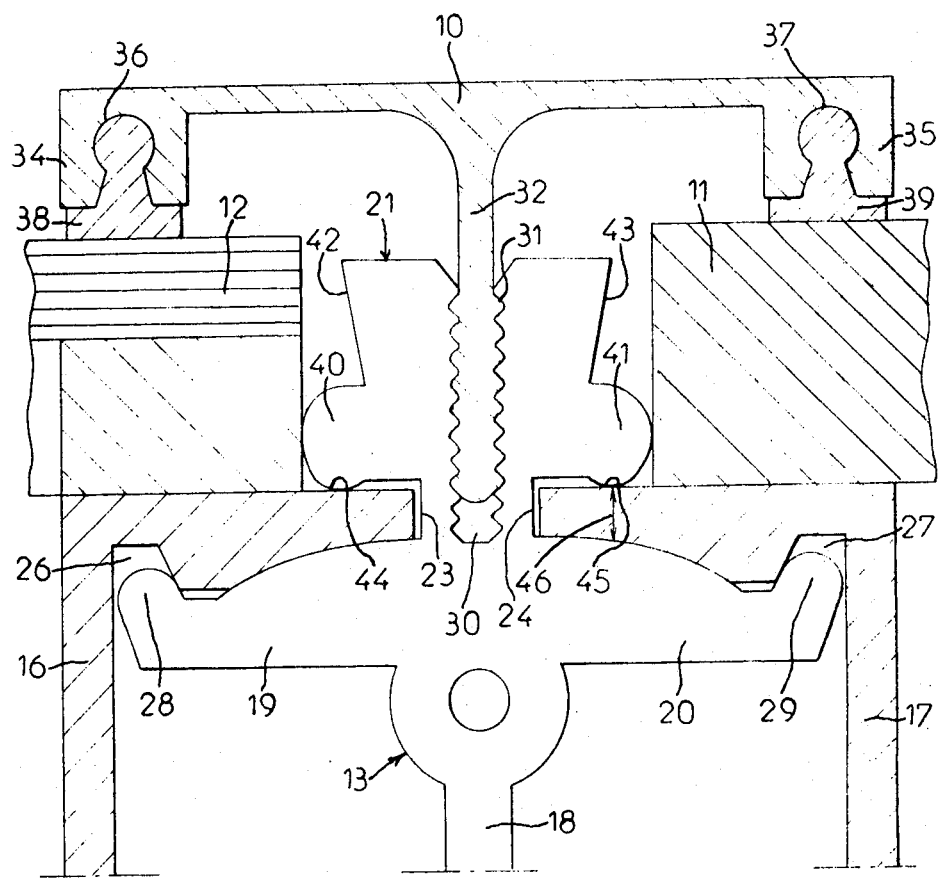
FIG. 1 is a schematic cross-sectional view of a device made in accordance with the invention.

As shown, a device for interconnecting two plates 11, 12 comprises a cover plate 10 to be clamped against one surface of the plates 11, 12, which form at least a part of a panel, wall or partition, a connector 13, and a pair of metal channel members 16, 17 for engaging the opposite surface of the plates 11, 12.

The connector 13 is of monobloc construction and includes a central web 18 having at each end flanges 19, 20 extending on opposite sides of the web 18, and a projection 21. Grooves 23, 24 are provided between the projection 21 and the flanges 19, 20, each groove receives a limb of a metal channel member 16, 17. These limbs are grooved at the inner corners at 26, 27 to receive ribs or hooks 28, 29 at the outer edges of the flanges.

The plates 11, 12 are applied against the limbs of the channel members 16, 17.

The plates 11, 12 are clamped against the channel members 16, 17 by the cover plate 10 which serves to cover the joint between the plates 11, 12.

The projection 21 is formed with a central slot 30 which has its open end towards the cover plate 10 and divides the projection 21 into two separate parts. Notches or grooves 31 are formed on both sides of the slot 30. The cover plate 10 carries a rib 32 which is provided with complementary notches or grooves. The notches enable the cover plate 10 to be applied to walls 11, 12 of various thicknesses.

The cover plate 10 has ribs 34, 35 at its edges in which are formed grooves 36, 37 which receive and hold flexible packing strips 38, 39 which bear upon the walls 11, 12.

The projection 21 has outwardly projection ribs 40, 41 on opposite sides against which the walls 11, 12 abut.

The projection 21 also has side surfaces 42, 43 which are divergent with their outer ends wider apart than the inner width between these surfaces. This enables, for example, window panes to be held temporarily while the cover plate 10 is being applied.

The ribs 40, 41 are provided with protuberances 44, 45 extending towards the flanges 19, 20, so that the distance between these protuberances and the flanges 19, 20 is less than the thickness 46 of the limb of the channel member 16, 17 engaged therein so that the two parts of the projection 21 are urged towards each other so as to grip the rib 32 of the cover plate 10. Each of said parts is thus gripped between one of said limbs and the rib 32.

Figure 2:
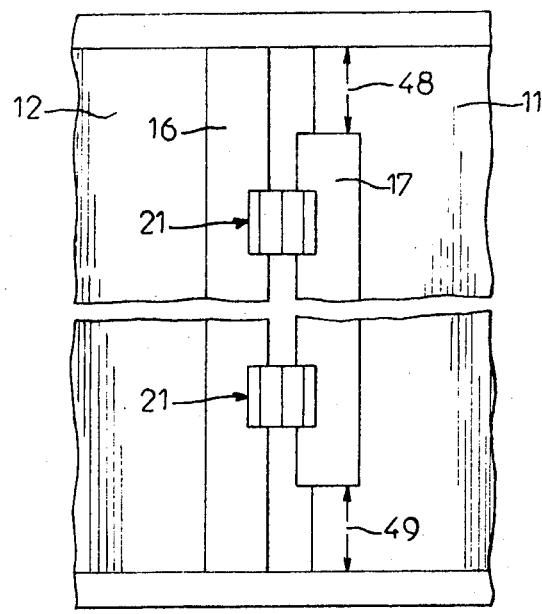
FIGS. 2 and 3 are elevational views showing different embodiments of the device in use.

As shown in FIG. 2 one of the channel members, viz. 17, is made shorter than the cover plate 10 sufficiently to enable the connectors 13 to be slid off the channel members 16, 17. Thus the member 17 leaves gaps 48, 49 for this purpose, the connectors 13 being shorter than these gaps.

Figure 3:
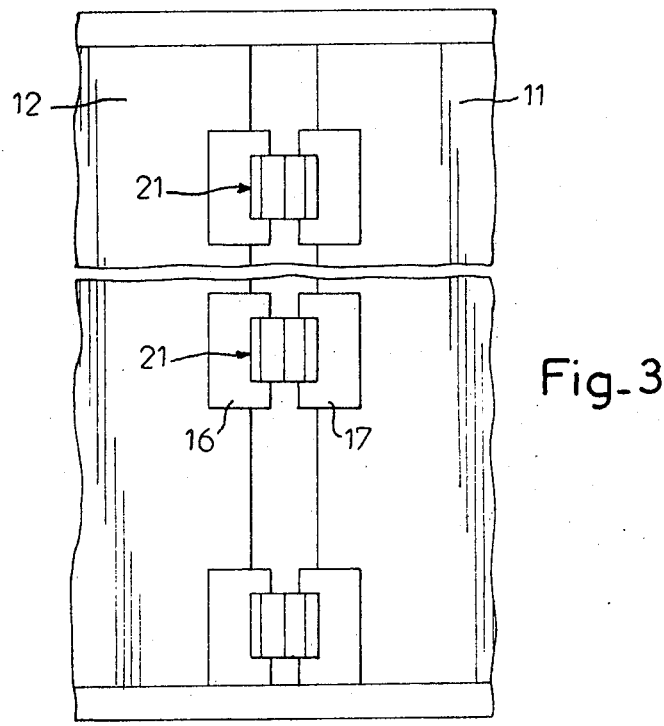

In the alternative form shown in FIG. 3 the channel members 16, 17 are quite short and arranged at intervals over the length of the cover plate 10 whereas the rib 32 of the cover plate is continuous over the length of the cover plate.

Thus it is not necessary to provide a wider vertical gap greater than that of the assembled walls for assembly or dismantling.

What is claimed is:

1. A device for interconnecting two adjacent, spaced plates lying in substantially the same plane and forming at least part of a wall, comprising a cover plate positioned on a first side of the plates and having surfaces for engaging a first side surface of each plate and a rib extending into the space between the plates, a connector positioned on the opposite side of the plates and having a central web provided at one end with a pair of transverse flanges extending from opposite sides of the web, and a projection extending from the flanges into the space between the plates, the projection being formed at its free end with a slot which divides the projection into two parts and receives said rib, the projection and flanges defining between them two opposed grooves, and a pair of channel members arranged one on each side of the connector, one limb of each channel member engaging the second side surface of a plate and extending inwardly towards the connector, the free end of each limb engaging in a groove of the connector, the minimum width of each groove being less than the thickness of its respective limb so that when the limbs are arranged in the grooves, the two parts of the projection are urged towards each other to grip the rib.

2. A device according to claim 1, wherein said connector and a channel member, on at least one side the connector are shorter than the length of the cover plate to permit assembly and dismantling of the device by sliding the connector on and off the channel member lengthwise of the cover plate.

3. A device according to claim 1, wherein the channel members are formed as a plurality of separate parts, the parts being located at spaced positions over the length of the space between the plates, the rib of the cover plate being continuous over the whole length of the cover plate.

4. A device according to claim 1, wherein the surfaces of the cover plate engaging the first surface of each plate are provided with grooves, a flexible packing being provided in the grooves, said flexible packing having a surface for engaging said first surface of the plate.

5. A device according to claim 1, wherein the projection carries outwardly extending arms, each arm engaging the edge of a plate.

6. A device according to claim 1, wherein the projection has side surfaces which are divergent with their outer ends wider apart than their inner width between said surfaces.

7. A device according to claim 1, wherein ribs are provided at the free ends of the flanges, said ribs engaging in complementary recesses formed in said limbs of the channel members.

8. A device for interconnecting two adjacent, spaced plates lying in substantially the same plane and forming at least part of a wall, comprising a cover plate positioned on a first side of the plates and having a pair of surfaces, each surface engaging a first side surface of a plate adjacent the space between the plate and a rib extending into the space between the plates, a plurality of monobloc connectors positioned on the opposite side of the plates, each connector having a central web provided at each end with transverse flanges extending from opposite sides thereof and a projection extending into the space between the plates, the projection being formed at its free end with a slot which divides the projection into two parts and receives a portion of the rib, the projection and flanges defining between them a pair of opposed grooves, and a pair of channel members for each connector arranged one on each side of the connector, one limb of each channel member engaging the second side surface of a plate and extending inwardly towards the connector, the free end of each limb engaging in a groove of the connector, the minimum width of each groove being less than the thickness of its respective limb so that when the limbs are arranged in the grooves, the two parts of the projection are urged towards each other to grip the rib.

* * * * *